US008081840B2

(12) United States Patent
Laurent

(10) Patent No.: US 8,081,840 B2
(45) Date of Patent: Dec. 20, 2011

(54) APPLIANCE FOR CONTROLLING TRANSPARENT OR REFLECTIVE ELEMENTS

(75) Inventor: Christian Laurent, Verviers (BE)

(73) Assignee: Automation & Robotics, Verviers (BE)

( * ) Notice: Subject to any disclaimer, the term of this patent is extended or adjusted under 35 U.S.C. 154(b) by 1009 days.

(21) Appl. No.: 11/628,515

(22) PCT Filed: Jun. 8, 2005

(86) PCT No.: PCT/BE2005/000094
§ 371 (c)(1),
(2), (4) Date: Jan. 16, 2008

(87) PCT Pub. No.: WO2005/121740
PCT Pub. Date: Dec. 22, 2005

(65) Prior Publication Data
US 2008/0232637 A1    Sep. 25, 2008

(30) Foreign Application Priority Data
Jun. 9, 2004    (EP) .................................... 04447138

(51) Int. Cl.
*G06K 9/00* (2006.01)
*G01N 21/00* (2006.01)
*G02F 1/03* (2006.01)
(52) U.S. Cl. ..... 382/284; 382/100; 382/144; 356/237.2; 359/245
(58) Field of Classification Search .................. 382/100, 382/141, 144; 356/237.2; 359/245
See application file for complete search history.

(56) References Cited

U.S. PATENT DOCUMENTS
4,291,304 A * 9/1981 Walter ............................ 345/33

5,307,141 A    4/1994 Fujieda
(Continued)

FOREIGN PATENT DOCUMENTS
DE    103 44 788    5/2005
(Continued)

OTHER PUBLICATIONS

International Preliminary Report on Patentability (translation), International Application No. PCT/BE2005/000094, 14 pages, European Patent Office.

(Continued)

*Primary Examiner* — Sheela Chawan
(74) *Attorney, Agent, or Firm* — Reinhart Boerner Van Deuren P.C.

(57) ABSTRACT

The invention relates to an appliance for measuring or controlling an optical element (3) comprising illumination means (1) and an associated artificial vision system (2), in which the optical element (3) can be inserted between the illumination means (1) and the artificial vision system (2), said illumination means (1) comprising programmable optoelectronic means for producing a luminous background with spatially and temporally variable brightness. The inventive appliance is characterised in that the programmable optoelectronic means are embodied in such a way as to consecutively generate a plurality of mires, each comprising a pattern which is repeated in a contrasted manner on a uniform background with a high spatial frequency of between 0.01 and 100 patterns/mm, or such that two adjacent patterns are separated by an angle between 0.1 and 30 degrees, said angle being measured from the point of the object on which the pattern is observed. Said generated mires are consecutively spatially staggered in such a way that a plurality of images corresponding to the mires is captured by the artificial vision system after reflection or transmission by the optical element (3), and recombined in the form of a single composed image.

20 Claims, 2 Drawing Sheets

U.S. PATENT DOCUMENTS

| | | | |
|---|---|---|---|
| 5,692,066 A * | 11/1997 | Lee et al. | 382/133 |
| 6,392,754 B1 | 5/2002 | Pingel et al. | |
| 6,437,857 B1 * | 8/2002 | Stockton | 356/124 |
| 6,476,909 B1 | 11/2002 | Nakayama et al. | |
| 7,075,633 B2 * | 7/2006 | Wegmann | 356/124 |
| 7,477,405 B2 * | 1/2009 | Finarov et al. | 356/625 |
| 7,528,942 B2 * | 5/2009 | Nakano et al. | 356/237.3 |
| 7,626,710 B2 * | 12/2009 | Finarov et al. | 356/625 |
| 7,751,037 B2 * | 7/2010 | Nakano et al. | 356/237.3 |
| 7,835,561 B2 * | 11/2010 | Meyer et al. | 382/131 |
| 2003/0137655 A1 | 7/2003 | Wegmann | |

FOREIGN PATENT DOCUMENTS

| | | |
|---|---|---|
| EP | 0 556 655 | 8/1993 |
| EP | 0 856 728 | 8/1998 |
| EP | 1 061 329 | 12/2000 |
| FR | 2 785 990 | 5/2000 |

OTHER PUBLICATIONS

R. Seulin, F. Merienne and P. Gorria; Machine Vision System for Specular Surface Inspection: Use of Simulation Process As a Tool for Design and Optimization; publication; 6 pages; Le Creusot, France 71200.

* cited by examiner

APPLIANCE FOR CONTROLLING TRANSPARENT OR REFLECTIVE ELEMENTS

CROSS-REFERENCE TO RELATED PATENT APPLICATIONS

This patent application is the National Stage of International Application No. PCT/BE2005/000094 filed Jun. 8, 2005, that claims the benefit of European Application No. 04447138.1 filed Jun. 9, 2004.

FIELD OF THE INVENTION

The present invention relates to a device for:
- detecting defects or locating semi-visible marks present in transparent or reflective optical parts, for example detecting deformations and appearance defects ("cosmetic control");
- measuring the optical properties of such optical parts (for example characteristics of divergence, refraction, transmission factor, power or vergence, curvature, diffusivity, etc.).

One example application area of the invention is the control of optical lenses and of all transparent and/or reflective products in the ophthalmic industry.

A reflective product is defined a priori as being a product with a surface that reacts to incident light according to the law of specular reflection.

The invention also relates to the control of the appearance of translucent products and/or products having a diffuse reflection.

TECHNOLOGICAL BACKGROUND

State of the Art and Technical Problem to be Solved

Detection and Classification of Appearance Defects

Numerous methods are known and used in artificial vision for the automatic detection of defects, they implement lighting systems with properties that are adapted to the particular type of defect to be detected. Mention may be made for instance of devices with bright and black fields, projection systems, systems of alternation observations for instance in the form of black and white strips, Schlieren methods, called "knife edge", etc.

Three main types of defects that may appear simultaneously are considered here (non-exclusive):
- diffusing defect: visible even if it affects a small area; "scatters" the light in the usual sense;
- deflecting defect: does not entail diffusion but a local modification of the refraction effect (for example "magnifying" effect);
- absorbing defect: locally decreases the transmission.

Known devices are often characterised by a motion requirement, either for the parts to be observed or for the lighting devices (FR-A-98 14417, EP-A-556 655, "Machine Vision System for Specular Surface Inspection: Use of Simulation Process as a Tool for Design and Optimization", R. SEULIN et al., Laboratory Le2i, QCAV-days, 21-23 May 2001, Le Creusot, France) or else by suitable projection devices (EP-A-856 728). One thus obtains systems with configurations that are determined by the goal to be achieved and by the mechanical, geometrical or optical means implemented.

Numerous lighting systems have their configuration determined by the size and shape of the object to be observed, as for instance the device described in document U.S. Pat. No. 6,476,909. It proposes an device for inspecting an optical part, in which a diffusion means is interposed between the source of light and the part to be inspected. The diffusing element is preferably a two-dimensional LCD panel with three zones differing in terms of their diffusion transmission factor: a central zone with weak diffusivity, a peripheral zone with high diffusivity and an external mask surrounding these two zones and intercepting the light. The shapes of these first two zones depend on the shape of the object to be inspected. The size of the central zone depends on the size of the object. The images of the object are received on a CCD camera. In the absence of any defect, the image of the object is only formed by the light issuing from the homogeneous central zone. Thus, the absorbing defects or dusts, i.e. of a black or dark colour, have a weaker luminance than the rest of the image. By contrast, any diffusing particle scatters both the direct light issuing from the central zone and the indirect light issuing from the peripheral zone, which increases local luminance at the location of the defect. This device therefore allows to simultaneously detect several types of defects. This document essentially describes the observation of an optical part over a homogeneous central background. This is a "black field" method where the background is grey rather than black so that absorbing defects appear. It is easy to understand the limitations of such a device for classifying or even detecting defects with (little) deflection or defects, even major ones, that are at the same time absorbing and diffusing due to the antagonist effects of these two types of defects.

Moreover, and particularly for "large-size" objects, the various points of the object are not illuminated in the same way with this kind of device. This makes the sensitivity of defect detection dependent on the position and also on the orientation of the defect, when the latter scatters the light in an anisotropic way. A defect such as a scratch for instance located on the edge of the examined object may deflect the light differently depending on its orientation. Thus, with the above-described device, a tangential scratch may very well be detected whereas an identical radial scratch may possibly not be observed.

It is known that deflecting defects and defects diffusing light at a low angle or in a narrow cone are advantageously detected with great sensitivity by "Schlieren techniques" which are, however, hardly suitable for objects with variable surface characteristics or for switching from one model of object to another.

Measurement of Optical Properties

The situation is quite similar for measuring optical characteristics. Many types of devices may thus be found:
a) for instance, a first type of equipment provided with projection systems having (a) mask(s) of suitable shape for measuring the optical power (contrary of the focal length) according to the so-called "Hartmann" technique and comprising devices for measuring the light projected either onto a screen or directly onto a sensor. By a calculation based on the deformation of the pattern associated with the mask, these devices allow to analyse the wave front obtained after transmission or reflection on the component to be studied. The latter may be placed in the projection device before or after interception of the light by the mask;
b) in addition, devices that in particular allow to simply calculate the optical properties by analysing the enlargement, in general anisotropic and non-homogeneous, of the image of a pattern (called a "definition chart") observed by refraction or reflection on the surface of the object to be examined, depending on whether the latter is transparent or reflective. Thus, the Applicant developed a device for determining the mapping of the optical power of lenses. This product, called Lensmapper™ has been sold to the ophthalmic industry since 1994. The principle of this device is similar to the subject matter of U.S. Pat. No. 6,392,754 held by Innomess GmbH, Marl (DE) for reflective surfaces and to that of European patent application EP-A-1 061 329, held by a firm that is independent of the Applicant and essentially working for the ophthalmic industry.

Therefore, the problem that arises both for detecting defects in optical parts and for determining the optical properties of components, is that the existing measurement devices are limited, as a result of their relatively rigid configuration, to a restricted range of applications.

There is therefore a need for a device for the precise measurement or for the detection of appearance defects that would be flexible according to the application chosen over a wide range (for example detecting many types of different defects over the entire surface of the object) and that would allow the "pick and pay" implementation of various lighting methods (for example black or bright field, alternation of black/white fringes, spots or definition chart with dots, etc.).

AIMS OF THE INVENTION

The present invention aims to provide a device allowing to detect, in precision or quality optical parts, defects of any kind, whose characteristic sizes extend over a very wide range, typically between one micron and several millimetres for most lenses.

The invention aims in particular to provide a device for highlighting multiple categories of appearance defects or structural discontinuities such as marks, outlines, etc. which, as a result of their specific interaction, possibly strongly anisotropic, with the light and as a result of their orientation, may require very variable configurations of the lighting device used and hence a high degree of adaptability of the latter.

The invention also aims to provide a flexible device for measuring the characteristics of optical components, in particular in the ophthalmic industry.

MAIN CHARACTERISTIC ELEMENTS OF THE INVENTION

A first aspect of the present invention relates to a device for the optical inspection or for the measurement of optical, geometrical or calorimetric properties of an optical part, i.e. a transparent, translucent or reflective object, including an optical part with a diffusing reflection.

The device according to the invention comprises a lighting means and an associated system of artificial vision, said inspected or measured object being spatially interposed between the lighting means and the artificial vision system.

According to the terms of Claim 1, the lighting means comprise programmable optoelectronic means in order to produce a luminous background of a luminance that varies in space and in time. Said programmable optoelectronic means are designed to consecutively generate a plurality of definition charts, each one comprising a pattern that is contrastingly repeated over a uniform background with a high spatial frequency, between 0.01 and 100 patterns/mm, or such that two adjacent patterns are separated by an angle between 0.1 and 30 degrees, said angle being measured from the point of the object on which the pattern is observed, said consecutively generated definition charts being spatially shifted so that a plurality of images corresponding to said definition charts are collected by the artificial vision system after reflection or transmission by the optical part and recombined in the form of a single compound image. The spatial frequency and the size of the patterns are selected so as to suit the characteristics of the examined object, whether in terms of defects or of optical power, according to the case.

Preferred embodiments of the device as in the invention are described in secondary claims 2 to 16.

A second aspect of the invention relates to the use of the above-described device for inspecting an optical part, reading moulded or engraved marks, observing discontinuities on the surface of the object or tracing the outline of the object.

A third aspect of the invention relates to the use of the above-described device for measuring the optical or geometrical properties of the object, in particular for measuring the optical power or the curvature, possibly anisotropic, of an optical part.

The invention allows this use to be compatible with a flexible and rapid change of the type of method used such as the black or bright field method (at least partial), knife-edge method or the use of (an) essentially point-shaped luminous zone(s).

DESCRIPTION OF A PREFERRED EMBODIMENT OF THE INVENTION

Figure 1:
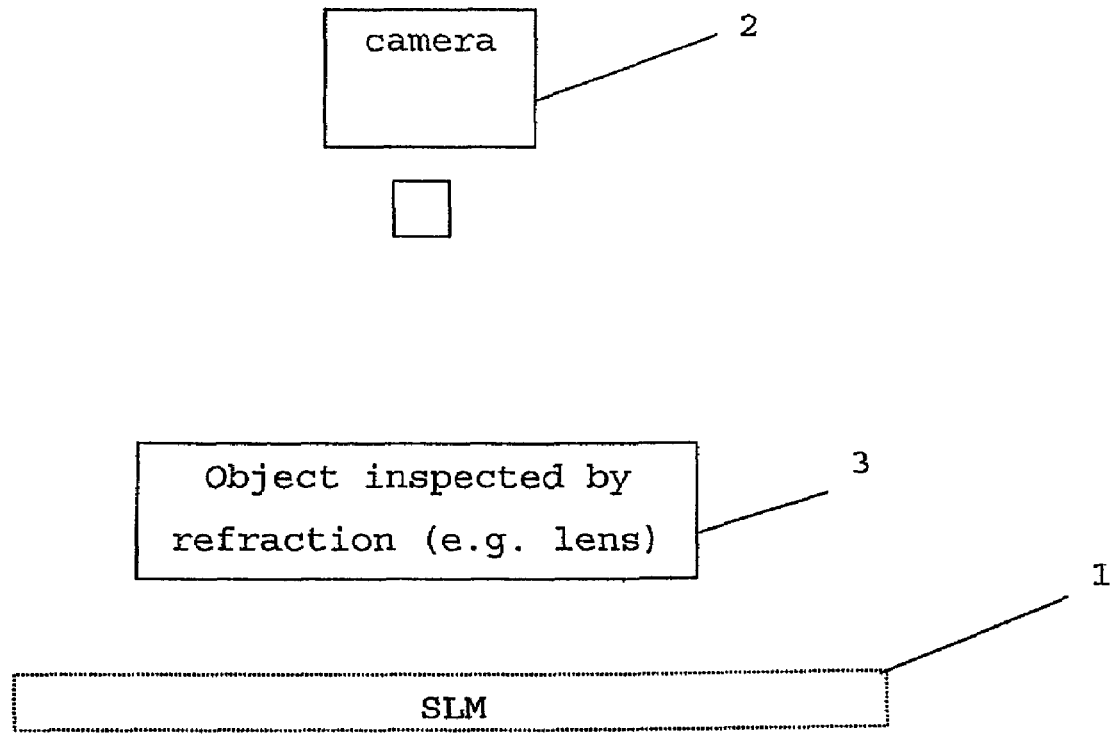
FIG. 1 very schematically shows the device as in the present invention in the case of the inspection by refraction of an object, for example a lens.

As very schematically shown in FIG. 1, the present invention relates to the use of a spatial light modulator or SLM 1, for example a liquid crystal display (LCD) screen providing in a flexible, variable and precise way a lighting device associated with a camera 2, for example a CCD or CMOS camera, with or without an object lens, in order to inspect an optical object 3, in particular, for example, for detecting defects, reading marks (moulded or engraved), observing discontinuities (edge of the lens) or tracing the outline of a segment of a multifocal lens, measuring optical properties, and to do this by generating suitable definition charts or dots of a suitable size at positions selected ad hoc.

In the broadest sense, an SLM is a lighting device that allows the digital or analogue control of the light intensity and of the local colour that it produces, transmits or reflects at any point, possibly in a determined direction.

An SLM is usually an electro-optical device comprising a 1D or 2D, and possibly 3D, network of pixels that can be used in reflection or in transmission and that can be individually and instantly activated by optical, electrical, etc. means. Each of these pixels may modulate the phase and/or the light intensity that is propagated through it or by reflection onto it. Most often, SLMs are produced by using liquid crystal displays (LCDs) but the invention may also be implemented by using an analogue lighting device.

According to a preferred embodiment of the invention, the installation comprises a system of artificial vision comprising a camera possibly associated with an object lens, a system for image digitalisation and an image processor, this artificial vision system being linked to a programmable LCD display possibly provided with mirrors if necessary in order to extend the observation field. The image of the display is viewed, after reflection or transmission, by the artificial vision system via the camera.

For example, a CCIR CCD camera with 752×582 pixels provided with an object lens of 50 mm focal length will be used. The SLM may be an SVGA LCD display with 800×600 pixels displaying a periodic pattern such as a chequered pattern or contrasted alternating black and white lines, with variable shift. It will be noted that the definition charts are selected at least so that the contrast between the generated pattern and the background of the lighting means is high and so that this generated pattern has clean transitions. For the capture and processing, including the calculation of the maximum, minimum or average of images, etc., a PC will be used with a graphics card and a display card for LCD such as found in the state of the art.

Figure 2:
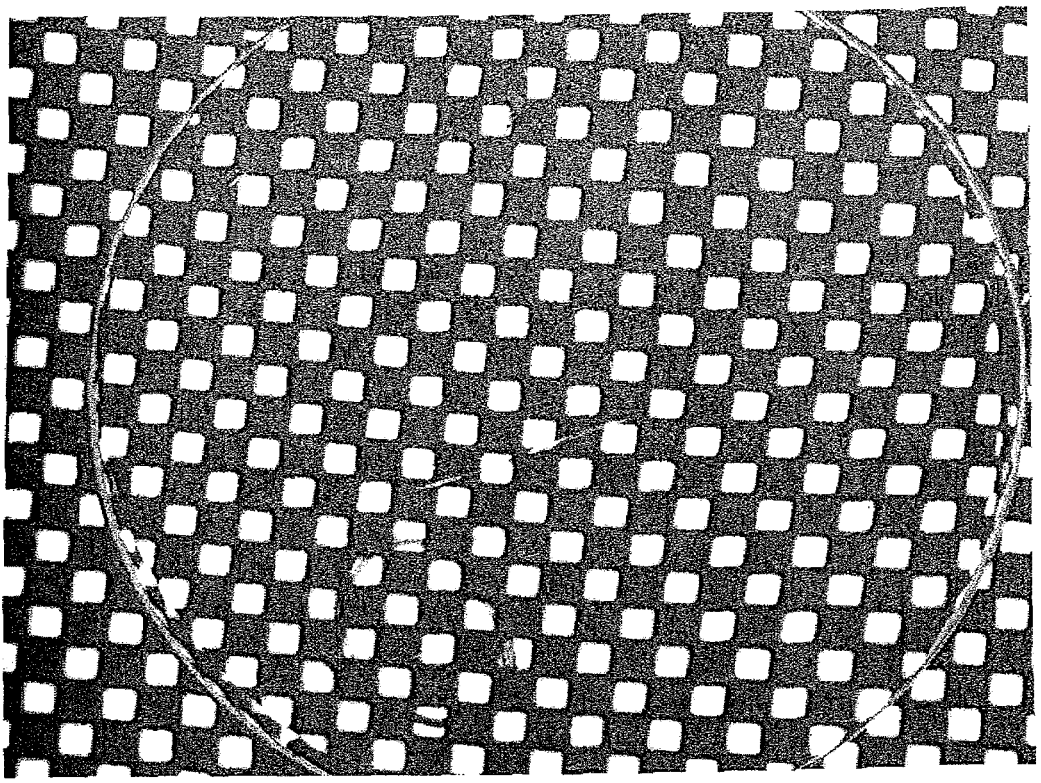
FIG. 2 shows an example image of a lens having appearance defects over a two-dimensional definition chart background, selected from a collection of consecutive images taken with the definition chart that is shifted by a constant pitch in the two main directions, by means of a preferred embodiment of the device as in the present invention.

FIG. 2 shows the image of a lens, taken with a device of the above-described type and having appearance defects (circle marked with felt pen, scratches, fingerprints, etc.). Each particular image is taken over the background of a two-dimensional definition chart in the form of a strongly contrasting black and white chequered pattern. The distance between the lens and the support of the definition chart is of the order of 50 mm and the distance between the lens and the camera is of the order of 500 mm.

In this particular case, 9 different images were consecutively taken at intervals of about one second. Between one image and the next, the definition chart was shifted by a pitch corresponding to one third of the pattern repeat in the two main directions.

Figure 3:
FIG. 3 shows a resulting image obtained by recombining the images of the type shown in FIG. 2 by means of image processing.

The recombined image shown in FIG. 3 was obtained by retaining the minimum grey level among the 9 possible values for each position (pixel).

When this device is correctly used, it provides results of very high, even unequalled, quality for detecting appearance defects thanks to the logical, simple and rapid use of the multiple images obtained with suitable definition charts.

The synchronisation between the system for taking images and the display may be easily created without additional device. With this device, it is possible to vary the type of method used (partial black fields, bright fields, alternating contrasts of black and white, use of several positioning points with adjustment according to the optical power of the product or to the type of defect, etc.).

For a given type of method, the various adjustments that can be carried out at will on the contrasting definition charts and on the image combinations of these definition charts (analysis) allow to modify the various parameters, affecting for one thing the detection sensitivity and for another the appearance of the defect images depending on their type. This technique allows sensitive classification, identification and detection.

Optical control can also be achieved by using the principle described under a) above with an advantage in flexibility with regard to the shape and positioning of the light source(s), or by using the principle described under b) above with an advantage in flexibility with regard to the production of one or several patterns and the opportunity to adjust the pitch of the definition chart, to display particular reference points in order to identify the absolute shift of the image observed, which is moreover known only to within about an integer multiple of the pitch of the pattern in the case of a periodic pattern, etc.

Optical control of the parts may also be achieved by implementing Moiré techniques, the definition charts being chosen to allow the interference phenomenon between, on the one hand, a separate network or the CCD sensor of the control camera and, on the other hand, the pattern displayed.

Lastly, the properties relating to the colour information may be determined by analysing the grey levels obtained for various colours of the display and any polarisability of the light emitted by the display, as is the case for example with an LCD display, may by exploited in order to verify the properties of the product as a function of its orientation.

According to the invention, defects of any nature may thus be advantageously detected, the definition charts being chosen in particular according to the scale of the discontinuities or the surface imperfections: microscopic for diffusing defects, of the order of 0.1 mm in size for most defects of surface distortion due to inclusions or marks, or even several mm or more for particular surface deformations.

The invention claimed is:

1. Method for measuring or controlling an optical part (3) by means of a device comprising at least lighting means (1) and an associated system of artificial vision (2), in which the optical part (3) may be interposed between the lighting means (1) and the artificial vision system (2), said lighting means (1) comprising optoelectronic means for producing a luminous background with a definition chart that is globally fixed and made of a plurality of programmable pixels of a luminance that can vary in time, characterised by the following successive steps:
   a plurality of definition charts are consecutively generated in time, each comprising a periodic pattern that is contrastingly repeated over a uniform background so that said consecutive definition charts are spatially shifted relative to one another,
   a plurality of images of said shifted definition charts are collected by the artificial vision system (2) after reflection or transmission by the optical part (3),
   said images are recombined in the form of a single compound image,
   data about the measurement or control is extracted from the single compound image;
   wherein the periodic pattern has a spatial frequency between 0.01 and 100 patterns/mm in a specified direction; or
   wherein two adjacent patterns are separated by an angle between 0.1 and 30 degrees, said angle being measured from a point of the object through which the pattern is observed.

2. Method as in claim 1, wherein the pattern used is selected from the group consisting of a dot, a spot, a regular or irregular geometrical shape, a horizontal, vertical or diagonal line and any combination of at least two of these elements.

3. Method as in claim 1, wherein definition charts with a central symmetry are used, each pattern comprising the centre of symmetry and being shifted by one angular pitch that is constant relative to the adjacent pattern.

4. Method as in claim 1, wherein the single compound image is obtained by retaining for each pixel the minimum grey level or any logical more or less complex combination of the pixels corresponding to the images of the shifted definition charts.

5. Method as in claim 1, wherein the spatial shift of the definition charts is a translation or rotation shift.

6. Method as in claim 1, wherein the definition charts are selected so that the generated pattern has clean transitions.

7. Method as in claim 1, wherein said electro-optical means used comprise a 1D, 2D or 3D spatial light modulator (SLM).

8. Method as in claim 7, wherein the spatial light modulator (SLM) is of a liquid crystal display type (LCD TFT).

9. Method as in claim 1, wherein the artificial vision system used comprises a linear or matrix image sensor or camera linked to an image-processing system, or even a direct or indirect projection screen.

10. Method as in claim 9, wherein said camera used is a digital camera of a CCD or CMOS type with an object lens in front.

11. Method as in claim 1, wherein the extracted data is the reflection effect, for example by determining the anisotropic curvature, the slope or the distance of the surface, or the refraction effect, for example by determining the optical power through the analysis of the local or global shifts or enlargements.

12. Method as in claim 1, wherein a mask or minor with periodic network is used as additional auxiliary optical device.

13. Method as in claim 1, wherein the images obtained and recombined are analysed by the artificial vision system after a complete, one-, two- or three-dimensional sweep at the level of the lighting means over at least a fraction of a pattern repeat.

14. Method as in claim 1, wherein the colour of the generated periodic pattern can be adjusted.

15. Method as in claim 1, wherein the image processing is configured in order to combine the characteristics of the shifted images of the collected definition charts and in order to obtain and analyse data relative to the inspection or the optical properties of the object.

16. Method as in claim 1, wherein means are used for adjusting the types, parameters and shifts of the definition charts, allowing, through the analysis of the images obtained, to provide the characteristics of parameters associated with defects, as for instance diffusivity or amplitude of deformation.

17. Method as in claim 1 for the optical inspection of a transparent, translucent or reflective object, including with a diffusing reflection, preferably for detecting defects that deflect or scatter light, reading moulded or engraved marks, observing discontinuities on the surface of the object or tracing the outline of the object.

18. Method as in claim 1 for measuring optical or geometrical properties, possibly anisotropic, of a transparent, translucent or reflective object.

19. Method as in claim 18 for measuring the optical power or the curvature of the optical part.

20. Method as in claim 1 in the context of an black or bright field method, at least partial, of a knife-edge method or of the use of (an) essentially pointshaped luminous zone(s).

* * * * *